May 28, 1957 M. ARDITI ET AL 2,794,174

MICROWAVE TRANSMISSION SYSTEMS AND IMPEDANCE MATCHING DEVICES THEREFOR

Filed May 8, 1952 2 Sheets-Sheet 1

INVENTORS
MAURICE ARDITI
GEORGES A. DESCHAMPS
JACK ELEFANT

BY [signature]

ATTORNEY

INVENTORS
MAURICE ARDITI
GEORGES A. DESCHAMPS
JACK ELEFANT
BY Lucy P. Lantzy
ATTORNEY United States Patent Office 2,794,174

Patented May 28, 1957

2,794,174

MICROWAVE TRANSMISSION SYSTEMS AND IMPEDANCE MATCHING DEVICES THEREFOR

Maurice Arditi, Clifton, N. J., and Georges A. Deschamps, New York, and Jack Elefant, Brooklyn, N. Y., assignors to International Telephone and Telegraph Corporation, a corporation of Maryland Application May 8, 1952, Serial No. 286,762

15 Claims. (Cl. 333—33)

This invention relates to microwave transmission systems and more particularly to devices for tuning out mismatch impedances caused by discontinuities formed in or coupled to the transmission line.

In the copending applications of D. D. Grieg and H. F. Engelmann, Serial No. 234,503, filed June 30, 1951, and M. Arditi and P. Parzen, Serial No. 286,764, filed May 8, 1952, now Patents Nos. 2,721,312 and 2,774,046, respectively, a type of microwave transmission line is disclosed comprising, in one of its simplest forms, two conductors printed or otherwise disposed in substantially parallel relation on opposite sides of a strip or layer of dielectric material a small fraction of a quarter wavelength thick. The two conductors may be of the same width or one may be made wider than the other. The dielectric (strip) between the two conductors may be of substantially the same width as the narrowest of the two conductors or wider according to the relationships desired.

In the copending application of H. F. Engelmann and J. A. Kostriza, Serial No. 233,052, filed June 22, 1951, now Patent No. 2,734,170, this type of line is shown with a transducer in the form of a crystal holder coupled thereto together with a tuning stub in the form of an extension of the line to tune out impedance mismatch due to the presence of the transducer. Stub tuners of this character, however, are not symmetrical in function and do not always provide as perfect a match as sometimes desired.

One of the objects of this invention, therefore, is to provide a method and means for introducing susceptance in a microwave line of the parallel conductor type capable of tuning out any impedance mismatch that may be produced by junctions, bends, transducers and other discontinuities in or coupled to the line.

Another object is to provide relatively broadband junction for discontinuity couplings or structures in or associated with a microwave transmission line of the parallel strip form.

One of the features of this invention is the provision of a susceptance in the line adjacent junctions or other discontinuities in order to tune out any impedance mismatch produced in the line by such junctions or discontinuities. According to one form of the invention, the susceptance may comprise a small piece of wire, conductor protuberance, or other discontinuity forming means associated with the line conductor. The exact location or position of the wire or other discontinuity relative the line conductor is fairly critical since it comprises a lumped impedance, and after an approximate location is determined, it is usually necessary to adjust the position of the wire, or vary the amount or shape of the conductor protuberance or other equivalent structures, until an optimum instrument reading is obtained. Some forms of susceptance introducing means may comprise various forms of shorts between the two conductors or may comprise a variation in the width of one or the other of the two conductors or both. Once the form, shape, and position of a susceptance structure is determined, it may be reproduced accurately by photographic and circuit printing techniques.

The above mentioned and other features and objects of this invention and the manner of attaining them will become more apparent by reference to the following description taken in conjunction with the accompanying drawings, wherein.

Figure 2:
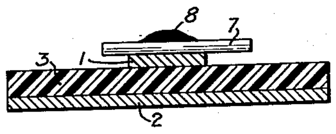
Fig. 2 is a cross-sectional view taken along line 2—2 of Fig. 1.
Figure 3:
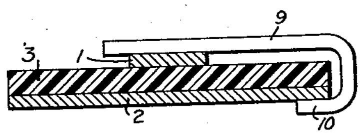
Fig. 3 is a cross-sectional view similar to that of Fig. 2 showing a modification of the susceptance device.
Figure 4:
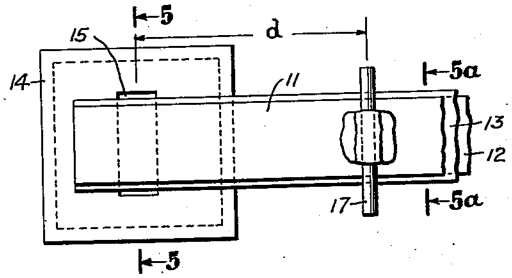
Fig. 4 is a plan view of a line coupled to a cavity resonator.
Figure 5:
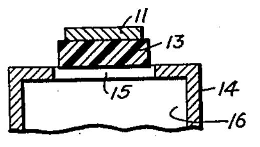
Figure 5A:
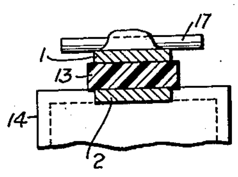
Figure 6:
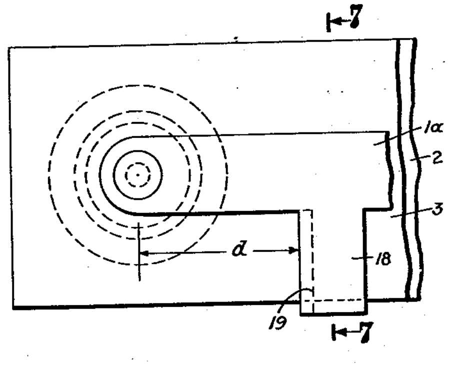
Figure 7:
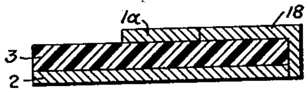
Figure 8:
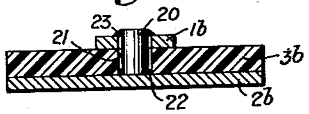
Figure 11:
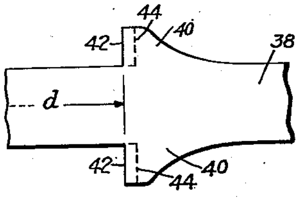
Figure 12:
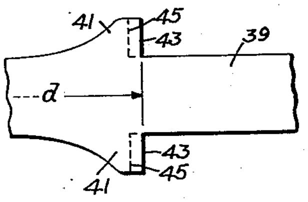
Figure 13:
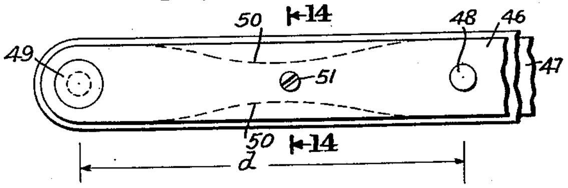
Figure 14:
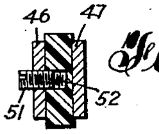

Figs. 5 and 5*a* are cross-sectional views taken along lines 5—5 and 5*a*—5*a*, respectively, of Fig. 4;

Fig. 6 is a plan view of a line provided with another form of susceptance;

Fig. 7 is a cross-sectional view taken along line 7—7 of Fig. 6;

Fig. 8 is a cross-sectional view similar to that of Figs. 2, 3, and 7 showing still another form of susceptance;

Figs. 9 to 13 are plan views of further modifications of susceptive arrangements for the strip type of line; and Fig. 14 is a cross-sectional view taken along line 14—14 of Fig. 13.

Figure 1:
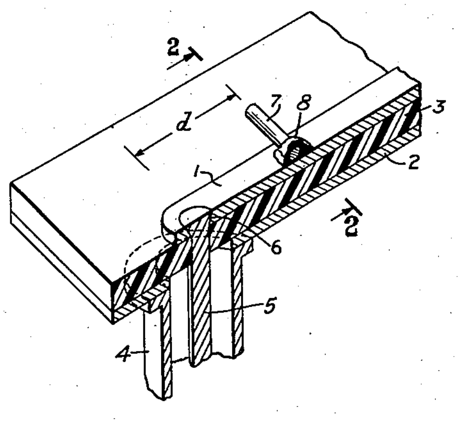
Fig. 1 is a view in perspective and longitudinal section of a strip form of transmission line having coupled thereto a transducer and one form of susceptance for tuning out any impedance mismatch introduced by the transducer.

Referring to Figs. 1 and 2, the microwave transmission line shown is of the printed circuit type comprising a first or "line" conductor 1 and a second or "base" conductor 2 with a layer 3 of dielectric material therebetween. The conductive material may be applied and/or shaped or etched on a layer of dielectric material, such as polystyrene, polyethylene, "Teflon," fiberglass, or other suitable material of high dielectric quality, in the form of conductive paint or ink, or the conductive material may be chemically deposited, sprayed through a stencil or dusted onto selected prepared surfaces of the dielectric, or by any other of the known printed circuit techniques. The spacing of the two conductors is preferably selected a small fraction in the order of about 1/10 to about 1/5 of a quarter wavelength of the microwave propagated therealong.

As shown in Figs. 1 and 2, a coaxial line comprising an outer conductor 4 and an inner conductor 5 is coupled to the line with the outer conductor secured to the second conductor 2 and the inner conductor secured to the first conductor 1 as indicated at 6. The coaxial coupling may comprise a junction for launching microwaves onto the line 1, 2, or it may comprise a coupling for receiving microwave energy from the line. Besides a coaxial coupling, the first conductor 1 may be extended into a waveguide or cavity in the form of a probe or loop, or coupling may be had by communication with a cavity or waveguide through an opening provided in the second conductor 2 directly beneath the first conductor 1. Instead of a transducer any means which presents a discontinuity in the line can be matched by this method.

Regardless of the circuitry or device to which the coupling or transducer 4, 5 is connected, the junction thereof with respect to the line 1, 2 invariably introduces an impedance mismatch in the line. To properly tune out the impedance mismatch, we provide in this form a small conductor or wire 7 disposed a distance from the junction such that a resonant section of length *d* is provided in the line adjacent the junction. The distance *d* preferably is smaller than a half wavelength (guide) for broad band tuning. Greater distances are more critical and narrower in bandwidth. The proper susceptance for establishing the tuning section is dependent not only on the size of the wire and its length but also the position and the distance of the wire with respect to the junction. Since the wire projection laterally of conductor 1 has its image reflected in the planar conductor 2 it appears as a shunt lumped impedance. This optimum positioning of the wire is not easily predicted but may be approximated. After an approximation is made the optimum position of the wire may be had by use of any suitable measuring technique, one satisfactory method of making such measurements being disclosed in the copending application of G. A. Deschamps, Serial No. 333,164, filed January 26, 1953. With the line connected for tests in such measuring system, the optimum position of the wire 7 may be obtained by nudging the wire slightly from position to position until the optimum reading is obtained. During this movement, it is preferable to apply solder to the wire and to maintain it molten with a soldering iron by which the wire is nudged from one position to another. When an optimum reading is obtained, the solder is permitted to freeze.

In one embodiment employing a 50 ohm line and a coaxial junction for a transducer coupling, the following relation was obtained for optimum impedance matching. The first conductor was 6 millimeters wide and the dielectric (fiberglass) between conductors was 1.5 millimeters thick. The wire 7 was No. 16 with a length of 9 millimeters. The distance between the center of the wire and the center conductor 5 was about 9 millimeters.

In Fig. 3 a slight modification is shown of the wire type of tuner (Fig. 2) wherein the wire is shown at 9 to be extended crosswise of the line for connection to the second conductor as indicated at 10. This shorting of the conductor may be preferred in certain installations but when used it tends to interfere with the optimum adjustment of the wire for tuning purposes.

In Figs. 4, 5, and 5*a* the line is shown to comprise a first conductor 11 and a second conductor 12 of substantially equal widths spaced apart by a layer of dielectric material 13 of equal or slightly greater width. To this line is coupled a cavity resonator 14 by communication through an opening 15 in the second conductor 12 directly in line with conductor 11. The degree of coupling with the cavity 16 is determined by the size and position of the opening 15. The same type of tuning device is shown as previously described, that is a short piece of wire 17 is used crosswise of the conductor 11 a space *d* from the junction at 15. While this wire 17 is shown on conductor 11, it may instead be located on conductor 12. Also such protuberance may be formed integral with one or the other of the conductors, in predetermined location and tuned by other means hereinafter described.

In Figs. 6 and 7 a tuning arrangement similar to that of Fig. 3 is shown wherein a shorting loop 18 is made integral with the first conductor 1*a* at the desired distance from the junction with the opposite end secured to the second conductor 2. This lateral extension 18 whether connected to conductor 2 or not provides an abrupt discontinuity in the line thereby presenting a lumped impedance in conjunction with the underlying conductor 2. Where the line conductor 1 is applied by a printing process, the accuracy of the position of the loop 18 may be predetermined by photographic means. Should the loop 18 not present the desired lumped susceptance value and spacing, the loop may be modified by slicing away portions thereof, thereby narrowing it and changing its effective spacing with respect to the junction, as indicated at 19.

Still another embodiment comprising an inductive obstacle between the first and second conductors is shown in Fig. 8 in the form of a post 20 disposed transversely of the two conductors 1*b* and 2*b*. A hole 21 is cut through the first conductor 1*b* and the layer of dielectric material 3*b* to the second conductor 2*b*. The post 20 which is preferably in the form of a small wire similar to the wire 7 is first soldered to the second conductor 2*b*, as indicated at 22, and then finally soldered to the first conductor 1 as indicated at 23. The solder, however, is maintained soft so that the position of the post 20 may be adjusted slightly toward or away from the junction or even laterally with respect to line 1*b* until an optimum position is obtained, whereupon the solder is permitted to freeze. This type of tuning arrangement is quite satisfactory in that it is contained within the line but it also is critical and may require final adjustment during manufacture to obtain optimum tuning. The post 20 provides a shunt susceptance in accordance with the diameter of the wire and its location with respect to the axis of the conductor 1*b*. For a wire of 0.024" in diameter in the center of a 50 ohm line, a shunt susceptance of −3.5 was obtained. The same wire located at the edge of the conductor 1*b* about 0.1" from the longitudinal axis of the conductor was found to have a shunt susceptance of −1.9. The shunt susceptance decreases when the wire diameter is decreased. By proper choice of the wire diameter and its location, a relatively wide choice of shunt susceptances is obtainable.

Figure 9:
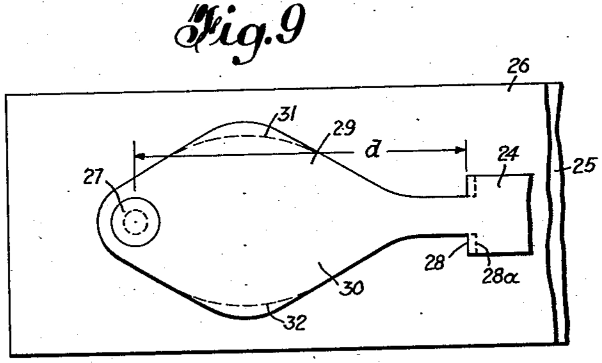

In Fig. 9 the first conductor 24 spaced from the second conductor 25 by dielectric 26 is shown to contain a variation in width to provide the desired location of susceptance with respect to the junction 27. The susceptance is provided by a step in the width of the conductor 24 as indicated at 28. In order to provide for adjustment after fabrication, the portion of the conductor between the susceptance 28 and the junction 27 is tapered outwardly as indicated at 29 and 30. The optimum susceptance value is then obtained by slicing off edge portions, such as indicated at 31 and 32. Should too much of the conductor be sliced off for optimum susceptance, then additional conductive material may be added such as solder so as to obtain the optimum value. The spacing of the susceptance 28 may also be adjusted by removing portions of conductor 24 as indicated by broken line 28*a*. If the resonant spacing is too great, conductive material could be added at 28 to thereby extend the normal width of conductor 24 toward junction 27.

The use of a variation in conductor width in the resonant section for susceptance tuning is possible since changes in width of the conductor in the resonant space has the effect of lengthening or shorting the resonant space depending upon whether the change is that of widening or narrowing the conductor.

Figure 10:
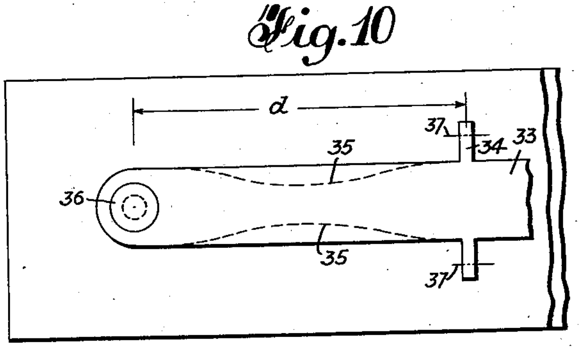

The form shown in Fig. 10 is similar to Fig. 7 except the first conductor 33 is provided with an abrupt increase in width at 34 at the desired location for the susceptance required. The portions 34 are similar to the wire 7 in Figs. 1 and 2 except that the portions may be printed as an integral part of the conductor 33. The tuning or trimming of this susceptance for optimum value is similarly obtained by slicing away portions of the conductor 33 as indicated by the broken lines 35 between the susceptance 34 and the junction 36. The susceptance at 34 may also be varied by removing parts from the extensions 34 as indicated by lines 37.

In Figs. 11 and 12 the first conductors 38 and 39 are provided with lateral extensions 40 and 41, respectively, which presents a susceptance in the line according to the abrupt edges 42 and 43 thereof. The location of the susceptance may be changed by slicing the edge portions of the extensions as indicated by the broken lines 44 and 45. The sides of the extensions opposite the abrupt edges 42 and 43 are gradually curved into the conductors 38 and 39 so as to produce minimum discontinuity.

In Figs. 13 and 14 the two conductors 46 and 47 are chosen of the same width similarly as in the case of Figs. 4 and 5. In this embodiment the susceptance is provided by means of a post 48, similarly as shown in connection with the form illustrated in Fig. 8. In the embodiment of Figs. 13 and 14, the post location is preferably made photographically during printing of the conductors. Since the resonant spacing $d$ between the post 48 and the junction 49 may not be optimum for the printed post location, the spacing may be adjusted so as to produce the optimum value. This adjustment may be done by slicing away edge portions of the conductor 46 as indicated by broken lines 50, similarly as described in connection with Figs. 9 and 10. Another method of tuning the resonant spacing $d$ which is vernier in character and may be used independently or in conjunction with slicing edge portions of the line is by means of a threaded post 51 disposed in an opening 52 in the resonant section. By varying the amount the post extends into the space between conductors 46 and 47, the resonant spacing $d$ may be tuned. According to tests with a 16″ wire as a post it was found that such post when fully extended crosswise of the line in an opening extending through both conductors and with the wire connected to one conductor only, that the tuning effect was that of lengthening the line about 0.008λ or 0.030 cm. For an intermediate position with the end of the wire about half way between the conductors the effect was roughly one-half the above figure or proportional to the length of the post inside the line. From the foregoing it will be observed that the screw post may be used for fine vernier adjustment.

By providing the susceptance in the line adjacent the junction of the transducer or other discontinuity, the line may be properly matched and made symmetric over a wide range of frequencies. While it is necessary to obtain a desired susceptance for a particular transducer connected to the line by experimentation, it will be clear to those skilled in the art that once an optimum arrangement is obtained that the same may be accurately reproduced by photographic methods in the printed circuit technique. The wire 7 of Fig. 1 for example may be made substantially as illustrated in Fig. 10 as lateral extensions of the first conductor. Also lateral extensions such as indicated by the loop 18 (Figs. 6 and 7) may be determined by photographic methods as well as such forms as indicated in Figs. 9 to 13. The opening 21 for the post in Fig. 8 may also be located accurately by photographic methods as mentioned in connection with post 48, Fig. 13, once such location is determined by experimentation. Further, since the mismatch presented by transducers ordinarily encountered in this type of transmission is small, and small susceptances are required to effect a proper matching section, a broadband section is obtained. By way of example, we have by the present means matched junctions symmetrically over a range of frequencies, in the order of 250 mc. at 4700 mc./sec.

While we have described above the principles of our invention in connection with specific apparatus, it is to be clearly understood that this description is made by way of example only and not as a limitation to the scope of our invention as set forth in the objects thereof and in the accompanying claims.

We claim:

1. In a microwave transmission line of the character having first and second conductors, means disposing said conductors in spaced substantially parallel relation a small fraction of a quarter wavelength apart to provide a waveguide having the space between said conductors conductively open along the sides thereof, means coupled to said line presenting a discontinuity in said line of the character tending to cause radiation of wave energy laterally of the open sides of said line, and means for introducing a lumped susceptance into the line leading to said coupling means to tune out any mismatch impedance presented by said coupling means, said lumped susceptance means comprising a conductor disposed to effect an inter-coupling between said conductors at a point substantially a resonant spacing from said coupling means, the structure determining said resonant spacing being alterable to effect sharp tuning and thereby minimize losses due to radiation laterally of said line in the vicinity of said coupling means.

2. In a microwave transmission line according to claim 1, wherein the means for introducing susceptance in said line includes conductor material of a width equal to a fraction of a quarter wavelength disposed transversely of one of said line conductors substantially a resonant spacing from said coupling means.

3. In a microwave transmission line according to claim 1, wherein the means for introducing susceptance in said line includes a conductor disposed in the space between said conductors interconnecting said first and second conductors substantially a resonant spacing from said coupling means.

4. In a microwave transmission line according to claim 1, wherein the means for introducing susceptance in said line includes a post conductor interposed in connecting relation between said first and second conductors substantially a resonant spacing from said coupling means.

5. In a microwave transmission line according to claim 1, wherein the means for introducing susceptance in said line includes a conductive portion presenting a width discontinuity in one of said conductors substantially a resonant spacing away from said coupling means.

6. In a microwave transmission line according to claim 5, wherein said conductive portion includes an abrupt enlargement laterally in the width of said first conductor.

7. In a microwave transmission line according to claim 5, wherein said conductive portion includes an abrupt decrease in the width of said first conductor.

8. In a microwave transmission line according to claim 1, wherein said susceptance means includes an abrupt discontinuity in the line and a variation in conductor width between said abrupt discontinuity and said first mentioned discontinuity.

9. In a microwave transmission line according to claim 1, wherein second of said conductors is wider than the first to present thereto a planar conducting surface for propagation of microwave energy in a mode corresponding approximately to the TEM mode, and the means for introducing a lumped susceptance includes a conductive portion electrically connected to said first conductor in image reflection relation with respect to the planar surface of said second conductor.

10. In a microwave transmission line according to claim 1, wherein both said conductors are of substantially equal width.

11. In a microwave transmission line according to claim 1, wherein the means for changing said resonant spacing includes means disposed within said resonant spacing for tuning the resonance thereof.

12. In a microwave transmission line according to claim 11, wherein the means disposed within said resonant spacing includes a threaded post threadably received in one of said conductors for adjustment transversely between the said first and said second conductors.

13. In a microwave transmission line according to claim 12, wherein said lumped susceptance is in the form of a conductive post disposed in interconnecting relation between said first and second conductors.

14. In a microwave transmission line of the character having first and second conductors, a strip of dielectric material disposing said conductors in spaced substantially parallel relation to provide a waveguide having the space between said conductors conductively open along the sides thereof, means coupled to said line presenting a discontinuity in said line of the character tending to cause radiation of wave energy laterally of the open sides of the line, a piece of conducting material slightly longer than the width of said first conductor disposed crosswise of said first conductor and located at a point on said line a resonant spacing from said coupling means for tuning out any mismatch impedance presented by said coupling means, and said piece of conducting material being adjustably fixed relative to said first conductor.

15. A microwave transmission line according to claim 9, wherein said conductive portion has its outer end terminated in a short to said second conductor.

References Cited in the file of this patent

UNITED STATES PATENTS

| | | |
|---|---|---|
| Re. 23,131 | Webber | June 28, 1949 |
| 2,238,438 | Alford | Apr. 15, 1941 |
| 2,344,884 | Kirkland | Mar. 21, 1944 |
| 2,411,555 | Rogers | Nov. 26, 1946 |
| 2,424,982 | Higgins | Aug. 5, 1947 |
| 2,540,488 | Mumford | Feb. 6, 1951 |
| 2,562,281 | Mumford | July 31, 1951 |
| 2,563,612 | Nebel | Aug. 7, 1951 |
| 2,602,856 | Rumsey | July 8, 1952 |
| 2,721,312 | Grieg et al. | Oct. 18, 1955 |
| 2,734,170 | Engelmann et al. | Feb. 7, 1956 |

FOREIGN PATENTS

| | | |
|---|---|---|
| 655,803 | Great Britain | Aug. 1, 1951 |